Jan. 6, 1953     A. DI ROSA ET AL     2,624,378
PATTERN-CONTROLLED REPRODUCING LATHE

Filed June 25, 1948     2 SHEETS—SHEET 1

INVENTOR
ANGEL DI ROSA
CARMELO DI ROSA
ALFREDO EDUARDO HAYES

BY Young, Emery + Thompson
ATTORNEYS

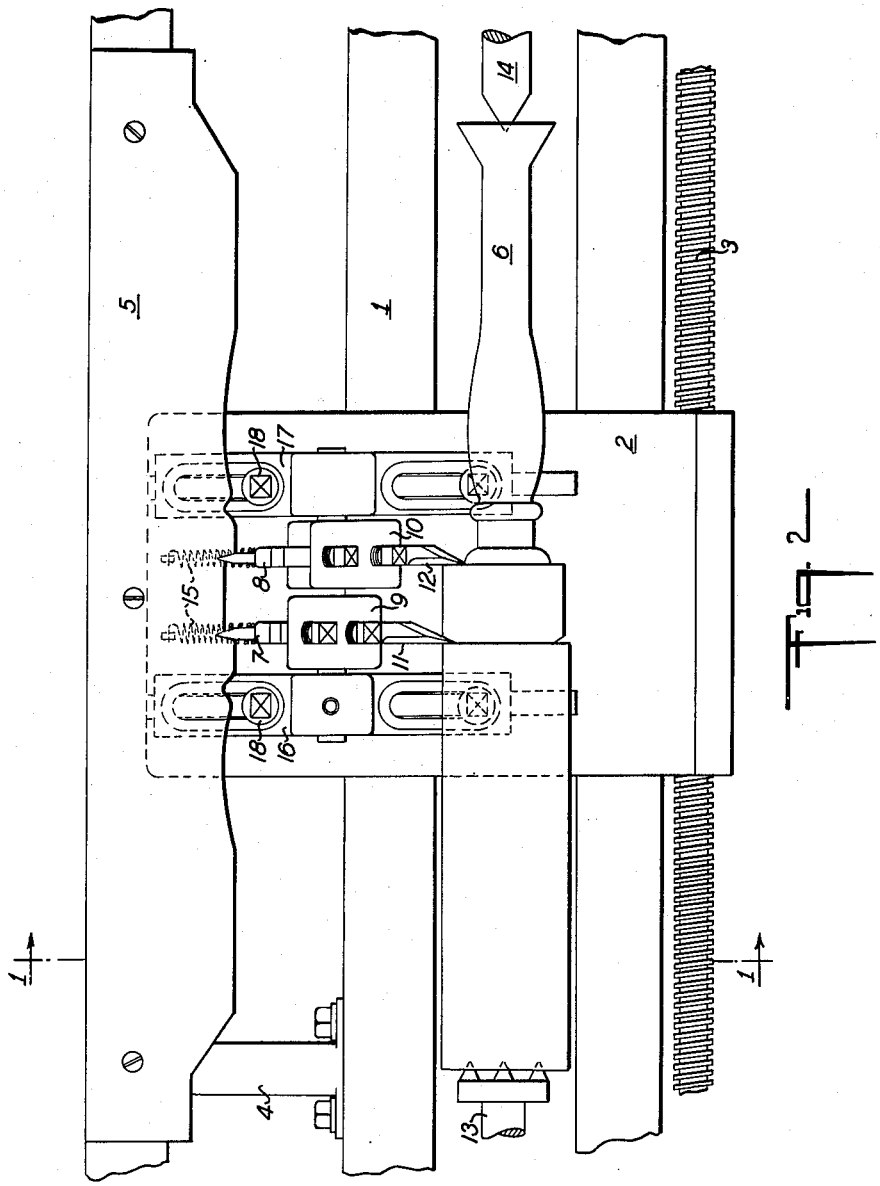

Patented Jan. 6, 1953

2,624,378

UNITED STATES PATENT OFFICE 2,624,378

PATTERN-CONTROLLED REPRODUCING LATHE

Angel Di Rosa, Carmelo Di Rosa, and Alfredo Eduardo Hayes, Buenos Aires, Argentina Application June 25, 1948, Serial No. 35,128
In Argentina September 4, 1947

3 Claims. (Cl. 142—7)

This invention refers to a lathe for shaping pieces from a pattern or model and more especially to devices of this type to be used for repetition work, independently of the class of material to be used.

Apparatus of this type are widely used in industries, chiefly because they make it possible to obtain a large number of pieces which are exactly alike from a pattern or model, the perfection of the work not depending upon the grade of skill of the operative, but on the perfection of the model.

It is true that similar devices exist for the same purpose, but they are expensive and require special machine tools for erecting and starting them.

This apparatus, on the other hand, is very easy to install and has been designed in such a manner that it can be mounted on any of the numerous kinds of conventional lathes, being affixed to the bench, on which the carriage is mounted which is conveyed parallel to said bench by means of a screw geared to the carriage.

This invention is chiefly characterized by having two tool carriers provided with ball bearings, which, as the carriage on which said tool carriers are mounted, advances, cause same to produce a forward and backward motion following the outline of the shape which it is desired to produce.

To this end the bench has, at the back a pair of arms to which the top of the modelling plate is fixed which has the outline or shape which it is desired to reproduce in cylindrical form.

Against this modelling plate, two abutments rest, which are fixed to the tool carriers, one of which is for rough cutting and the other for finishing, said abutments resting continuously against the plate. To avoid dropping of the tool carriers when there is no piece being worked on in the lathe, retention means are provided in the form of a helicoidal spring.

In view of the variations in diameter of the pieces to be shaped, forward or backward shifting of the tool carriers has been provided against, by means of slides, which are affixed by screws.

The chief advantage of the present invention is that any class of material can be worked, for instance, wood, Bakelite, fibre, brass and even steel, depending upon the working speed of the lathe and the advance required for each one of these various materials.

Further advantages will become evident to those skilled in the art upon perusal of the specification.

For clearer understanding and to permit easy putting into practice, a detailed description is given below, referring to the accompanying drawings:

Fig. 2 is a top plan view of the copying lathe.

In both figures the same reference numbers refer to the same or corresponding parts.

Figure 1:
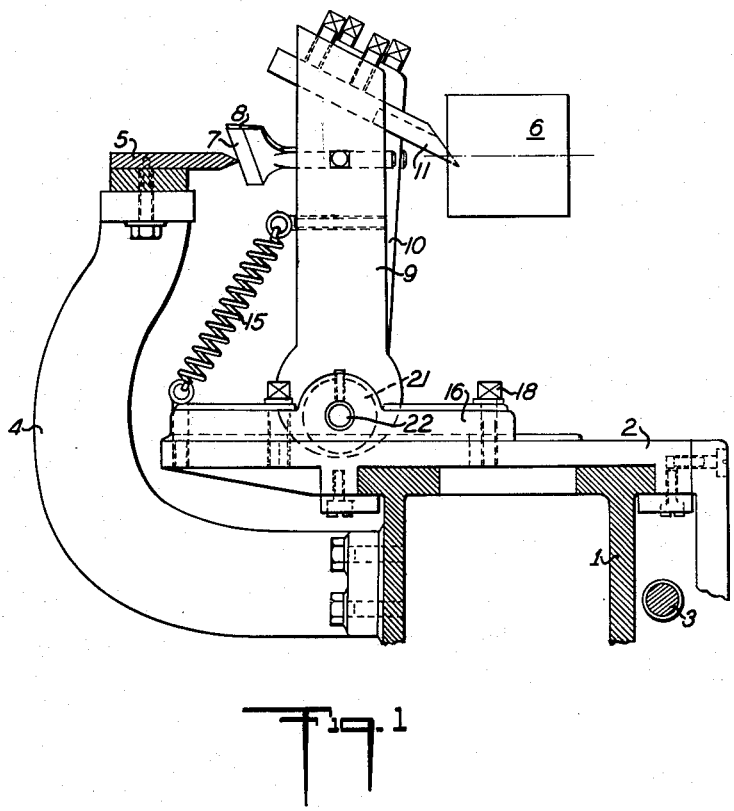
Fig. 1 is a longitudinal sectional view taken on line 1—1 of Fig. 2.

With reference to the attached drawings, 1 shows the bench on which the lathe can be fixed, said bench being a conventional frame on which a carriage 2 is mounted capable of movement parallel to the bench or frame 1 by a screw 3 geared to the carriage 2. The bench 1 has secured thereon in its rear portion a pair of arms 4 to the top of which is fixed the modelling plate or template 5 which has a peripheral pattern or shape corresponding to the desired configuration in cylindrical form and which is illustrated in Fig. 2 by the half-finished piece 6.

A pair of abutments or followers 7 and 8 are provided resting on or against the plate 5, which are fixed to tool carriers 9 and 10. The carriers 9 and 10 are provided with bearings 21 contacting a pivot rod 22 and which, when the carriage 2 advances, produce a forward and backward motion of the tool carriers and as a result thereof a rigidly attached tool 11 for rough cutting and tool 12 for fine cutting will produce the configuration 6, the members 13 and 14 being lathe centers between which the work to be cut is mounted. Thus, faithful reproduction is obtained inasmuch as the abutments 7 and 8 abut continuously on the template 5 due to a spring 15 for each tool carrier as best seen in Fig. 1. The template 5 and the spring 15 produce a forward and backward motion of the tool due to the bearings 21.

The tool carriers 9 and 10 can move forwards or backwards relative to the work, in accordance with the diameter of the material to be shaped by means of slide means 16 and 17 which are secured on the carriage 2 by screws 18 and which also support the pivot rod 22. The slide means 16 and 17 are adjustably positioned on the carriage 2 by being moved towards or away from the work or the lathe centers 13 and 14, depending on the diameter of the material to be shaped, and then locked in adjusted position by the screws 18.

The operation of the reproducing lathe is believed to be obvious from an examination of the drawings when considered in connection with the description, and as shown, the slide members 16 and 17 are adjustable on the carriage 2 to adjust the tool carriers 9 and 10 relative to the work dependent upon its size. Before the start of the machine the appropriate template 5 is mounted on the arms 4 and secured in position, and this template is provided with a peripheral curve to guide a follower for each of the tools. As seen in Fig. 2 of the drawings, the carriage 2 is adjusted to the extreme right and the machine is then started by rotating the spindle 13 and the work 6 at the same time that the screw-threaded shaft 3 likewise rotates. Thus, the tools 11 and 12 will cut the work to its proper configuration as guided by the template as the carriage is moved to the left.

It should be understood that the present invention is in no way limited to the embodiment described and illustrated, but that various modifications in detail and/or form can be introduced into same, which would be within the scope which is clearly established in the claims which follow.

We claim:

1. A lathe for producing turned articles comprising a frame, a plurality of arms secured at one of their ends to the frame, a template mounted on the other ends of the arms and having a contour corresponding to the article to be produced, a carriage movably mounted on the frame, a tool carrier provided with a follower which contacts the contour of the template, slide means adjustably mounted on the carriage to move with the latter and having means to pivotally receive the tool carrier and its follower, and means to slidably move the carriage on the frame parallel with the template during the turning of the article by the tool as controlled by the follower and template.

2. A lathe according to claim 1, in which a spring is provided connected to the carriage and the tool carrier to constantly urge the follower against the contour of the template.

3. A lathe according to claim 1, in which the slide means also pivotally receives a second tool carrier having a follower thereon, the tool on one of the carriers being a rough cutting tool and the tool on the other carrier being a finished cutting tool with the second follower also contacting the template.

ANGEL DI ROSA.
CARMELO DI ROSA.
ALFREDO EDUARDO HAYES.

REFERENCES CITED

The following references are of record in the file of this patent:

UNITED STATES PATENTS

| Number | Name | Date |
| --- | --- | --- |
| Re. 1,994 | Harper | June 13, 1865 |
| 1,363,238 | Duchemin | Dec. 28, 1920 |
| 1,757,155 | Witt | May 6, 1930 |
| 1,859,474 | Shawver | May 24, 1932 |
| 1,965,728 | Tautz | July 10, 1934 |